United States Patent
Gern et al.

(10) Patent No.: US 7,411,486 B2
(45) Date of Patent: Aug. 12, 2008

(54) LANE-DEPARTURE WARNING SYSTEM WITH DIFFERENTIATION BETWEEN AN EDGE-OF-LANE MARKING AND A STRUCTURAL BOUNDARY OF THE EDGE OF THE LANE

(75) Inventors: Axel Gern, Leutenbach (DE); Alfred Lotter, Grafenau (DE); Rainer Moebus, Stuttgart (DE); Volker Oltmann, Calw (DE); Bernd Woltermann, Fellbach (DE); Zoltan Zomotor, Stuttgart (DE)

(73) Assignee: Daimler AG, Stuttgart (DE)

( * ) Notice: Subject to any disclaimer, the term of this patent is extended or adjusted under 35 U.S.C. 154(b) by 226 days.

(21) Appl. No.: 11/287,612

(22) Filed: Nov. 28, 2005

(65) Prior Publication Data

US 2006/0132295 A1    Jun. 22, 2006

(30) Foreign Application Priority Data

Nov. 26, 2004   (DE) .................. 10 2004 057 296

(51) Int. Cl.
| | |
|---|---|
| B60Q 1/00 | (2006.01) |
| G08G 1/00 | (2006.01) |
| G08G 1/04 | (2006.01) |
| G08G 1/14 | (2006.01) |
| G08G 1/17 | (2006.01) |
| H04N 7/00 | (2006.01) |
| H04N 7/18 | (2006.01) |
| G05D 1/00 | (2006.01) |
| G05D 1/02 | (2006.01) |
| G06F 17/10 | (2006.01) |

(52) U.S. Cl. .............. 340/438; 340/435; 340/901; 340/932.2; 340/937; 340/943; 348/118; 348/119; 348/120; 348/135; 348/136; 348/143; 348/148; 701/1; 701/300; 701/301; 701/302

(58) Field of Classification Search ......... 340/435–438, 340/901, 932.2, 937, 943; 348/118–120, 348/135–137, 143, 148; 701/1, 300–302
See application file for complete search history.

(56) References Cited

U.S. PATENT DOCUMENTS 4,970,653 A * 11/1990 Kenue .................. 701/301

(Continued)

FOREIGN PATENT DOCUMENTS

DE    37 38 221 A1    6/1989

(Continued)

Primary Examiner—Benjamin C. Lee
Assistant Examiner—Lam Pham
(74) Attorney, Agent, or Firm—Patent Central LLC; Stephan A. Pendorf

(57) ABSTRACT

A driver assistance device for warning a driver of a motor vehicle of a risk of departure from the lane or from the lane is described, having at least one image-transmitting sensor, an evaluation device, connected to the image-transmitting sensor, for detecting edge-of-lane and/or lane markings and/or edges of lanes in the area sensed by the image-transmitting sensor, and a warning device which is connected to the evaluation device, in which driver assistance device in addition at least one distance-transmitting sensor is connected to the evaluation device, with which sensor the distance from objects which are elevated with respect to the surface of the lane can be determined in the region of the edge of the lane, in particular of a structural boundary of the edge of the lane.

8 Claims, 1 Drawing Sheet

U.S. PATENT DOCUMENTS

Figure 1:
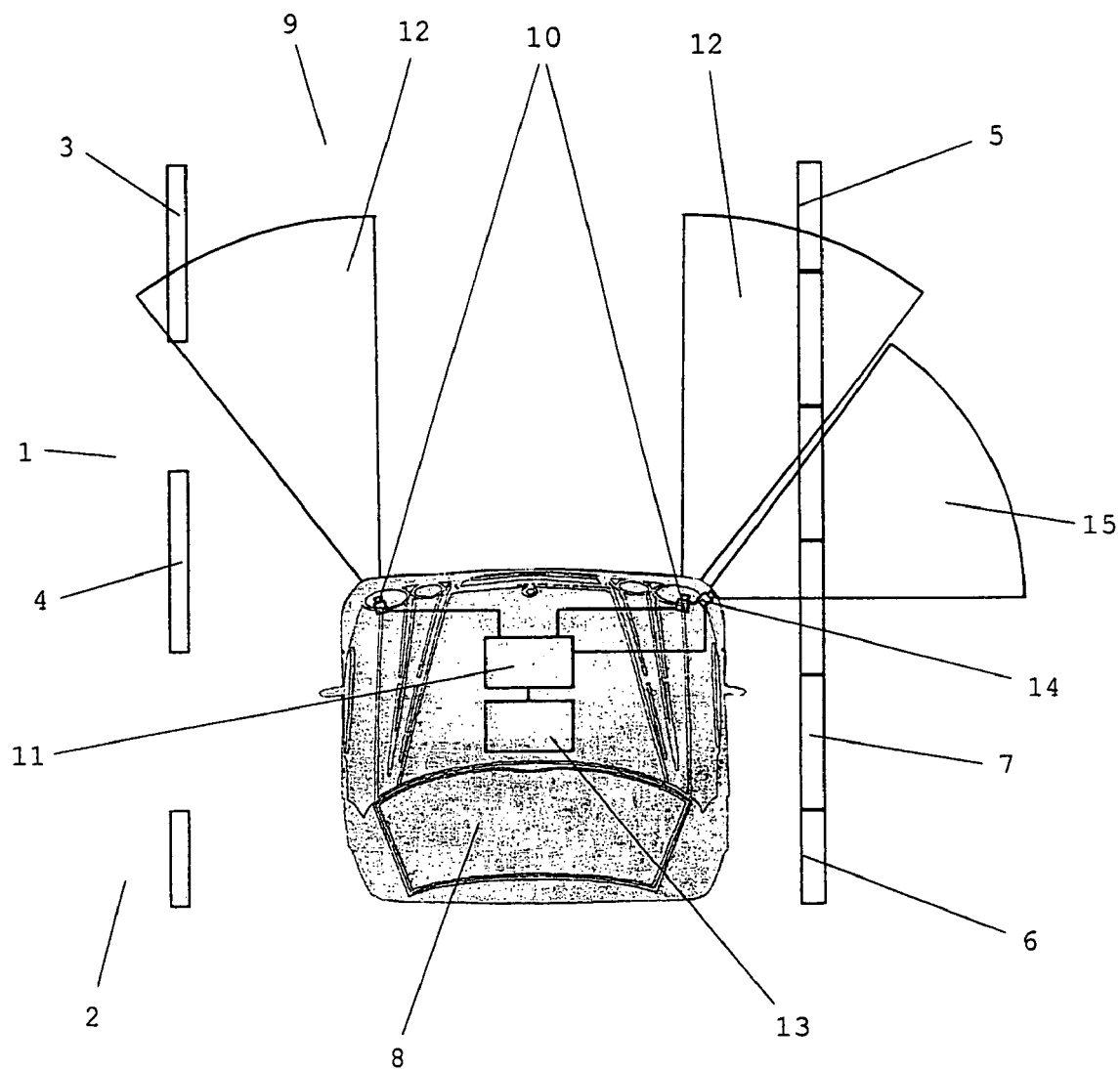

| | | | |
|---|---|---|---|
| 5,982,278 A * | 11/1999 | Cuvelier | 340/436 |
| 6,038,496 A * | 3/2000 | Dobler et al. | 701/3 |
| 6,249,214 B1 * | 6/2001 | Kashiwazaki | 340/425.5 |
| 6,317,057 B1 * | 11/2001 | Lee | 340/901 |
| 6,876,298 B2 * | 4/2005 | Litkouhi et al. | 340/435 |
| 7,038,577 B2 * | 5/2006 | Pawlicki et al. | 340/435 |
| 7,205,904 B2 * | 4/2007 | Schofield | 340/903 |
| 7,218,207 B2 * | 5/2007 | Iwano | 340/435 |
| 7,236,884 B2 * | 6/2007 | Matsumoto et al. | 701/300 |

FOREIGN PATENT DOCUMENTS

| | | |
|---|---|---|
| DE | 195 07 957 C1 | 9/1996 |
| DE | 199 49 409 A1 | 4/2001 |
| DE | 100 36 042 A1 | 2/2002 |
| DE | 101 14 932 A1 | 10/2002 |
| DE | 102 51 357 A1 | 5/2004 |
| DE | 102 60 855 A1 | 7/2004 |
| EP | 1 245 443 A2 | 10/2002 |
| JP | 59046570 A | 3/1984 |
| WO | WO 00/77736 A1 | 12/2000 |
| WO | WO 03/104023 A2 | 12/2003 |
| WO | WO 2004/055547 A1 | 7/2004 |

* cited by examiner

LANE-DEPARTURE WARNING SYSTEM WITH DIFFERENTIATION BETWEEN AN EDGE-OF-LANE MARKING AND A STRUCTURAL BOUNDARY OF THE EDGE OF THE LANE

BACKGROUND OF THE INVENTION

1. Field of the Invention

The invention relates to a driver assistance device for warning a driver of a motor vehicle of a risk of departure from the road or from the lane.

2. Related Art of the Invention

Modern driver assistance devices for warning a driver of a motor vehicle of a risk of departure from the lane or the lane, known as a lane-departure warning system, contribute considerably to increasing road safety through the detection of hazardous situations by outputting acoustic or optical warning signals when there is the risk of departure from the lane or the lane.

Contemporary lane-departure warning systems usually have an image-transmitting sensor for lane detection and lane detection, which sensor is connected to an evaluation device which detects lane markings, edge-of-lane markings and, in some cases, structural boundaries of the edges of the lane as edge-of-lane markings in the area sensed by the image-transmitting sensor. Such lane-departure warning systems typically warn the driver when the motor vehicle enters into contact with or passes beyond the edge-of-lane marking which is detected as the edge of the lane by means of a warning device which is connected to the evaluation device. In such a case, the warning device may both cause a warning signal to be output and bring about an automatic braking or steering intervention.

However, lane-departure warning systems which are equipped with only one image-transmitting sensor are not capable of differentiating between edge-of-lane markings and a structural boundary at the edge of the lane, for example kerb stones, crash barriers or concrete walls so that in particular in sections of a road in which no edge-of-lane markings are provided and a structural boundary forms the edge of the lane these do not reliably and adequately warn of a risk of departure of the motor vehicle from the lane. If, for example, a kerb is detected by such a lane-departure warning system as an edge-of-lane marking, damage to the tyres or the rims of the motor vehicle already occurs if a warning of a risk of departure of the motor vehicle from the lane is not issued until the motor vehicle enters into contact with or passes beyond the supposed marking. This damage and the associated hazard situation, together with the resulting loss of confidence of the driver of the motor vehicle in the reliability of the lane-departure warning system, have an adverse effect on the road safety of the motor vehicle. Furthermore, as a result of faults in the evaluation of the data supplied by the image-transmitting sensor incorrect warnings may easily occur, in particular in regions without edge-of-lane markings.

Furthermore, driver assistance devices are known which have at least two forwardly directed, image-transmitting sensors with which distances can be measured in particular from vehicles travelling ahead or from objects on the lane, in particular so that a vehicle travelling ahead can be followed at a constant distance, or so that, if appropriate, collision prevention measures can be taken by observing the change in the distance. Such driver assistance devices are known, for example, as Adaptive Cruise Control, abbreviated to ACC. The image-transmitting sensors of such ACCs are basically also suitable for detecting the lane markings or edge-of-lane markings, with a reliable distinction between a structural boundary of the edge of the lane and an edge-of-lane marking being impossible owing to the viewing direction of the forwardly directed image-transmitting.

DE 37 38 221 A1 discloses a method and a device for detecting the state of a road, in particular unevennesses on the surface and the edge of a lane, using electromagnetic waves such as light, according to the principle of transit time measurement, with a transmitter emitting measurement beams and a receiver receiving reflected measurement beams which produce signals which are to be evaluated on reception. In this context, by splitting the reflection into component surfaces the useful signal is separated and evaluated by forming differences between the respective transit times of the back-scattering to the receiver. The intention is that, by evaluating the differences between the back-scattered signals of a plurality of transmitters and receivers, a geometric relationship between the change in the signals, and thus also the edge of the lane, is to be formed so that unevennesses on the lane can be differentiated from those at the edge of the lane in order to set chassis properties such as, for example, damper response behaviour to the unevennesses detected on the surface of the lane.

EP 1 245 443 A2 has disclosed a driver assistance device for early detection of possible collisions of a motor vehicle, in particular with animals such as elks or bears, in which forwardly directed, image-transmitting sensors are used to determine the position and the distance from an object and the relative velocity between the motor vehicle and the object, and to acquire the probability of a collision therefrom, on the premise that the relative velocity is near to the motor vehicle's own velocity. The image-transmitting sensors are provided here for sensing objects which are located at a large distance ahead of the motor vehicle.

WO 00/77736 discloses a method for detecting objects in the surroundings of a road vehicle up to large distances, in which method the distance between a moving vehicle or stationary vehicle and one or more objects is calculated by distance-based image segmentation by means of stereo image processing, and properties of the detected objects are acquired by object detection in the segmented image areas. Image areas of elevated objects and/or flat objects are acquired and elevated objects and/or flat objects are detected by combining 3D points according to predetermined criteria, with elevated objects being determined by means of features with similar distance values, and flat objects by means of features with similar height values. As a result, other vehicles, for example parked vehicles, guideposts, bridge pillars, and lampposts can be differentiated from structural lane boundaries such as for example kerb or crash barriers.

DE 199 49 409 A1 discloses a method and a device for detecting objects having at least two distance-resolving sensors which are mounted on a motor vehicle and whose detection ranges at least partially overlap, with the relative positions of possible detected objects with respect to the sensors being determined using the triangulation principle in the overlapping region, and possible virtual objects, which arise as a result of the determination of objects, being acquired by means of dynamic consideration of objects. In this context, objects can be detected only within the overlapping region located in front of the vehicle in its direction of travel.

DE 102 60 855 A1 discloses a method for detecting object configurations by means of distance signals of at least two sensors, in which method the distance signals of a plurality of the sensors are subjected to a pattern detection by comparison with reference patterns which correspond to predefined model configurations. The method is provided for use in conjunction with ACCs, with motor vehicles which are travelling ahead being characterized by reflection points which remain the same in relation to one another on a group basis, and being detected as such by comparison with reference patterns so that of the plurality of reflection points which represent a motor vehicle that has been detected it is possible to consider exclusively the reflection point which is at the shortest distance from the actual motor vehicle in order to prevent a collision.

WO 2004/055547 A1 discloses a method and a device for detecting objects with vehicle-bound sensors whose sensing ranges overlap at least partially. In this context, signals from at least two sensors with essentially congruent sensing ranges and additional signals of a further sensor whose sensing range overlaps only partially with the sensing ranges of the other sensors are evaluated. An object is detected as relevant if it is detected by at least two sensors. This information is provided for further processing in an ACC, with relevant objects being motor vehicles which are located ahead of the actual vehicle on the same lane or an adjacent lane.

DE 101 14 932 A1 discloses carrying out three-dimensional sensing of the surroundings of the motor vehicle, for example in order to detect a parking space, by means of a distance sensor which emits radiation in one plane and is arranged on a motor vehicle, by recording the distance profiles during the movement of the motor vehicle. In this context, a three-dimensional image of the surroundings is generated by means of a distance sensor which generates a two-dimensional distance profile, and from a data processing means and a storage unit which processes successive distance profiles and stores them, and from a concatenation of a set of successive distance profiles.

According to the prior art, it is consequently not known to differentiate a structural boundary of the edge of the lane from an edge-of-lane marking by means of suitable sensors and to use this information to improve the method of operation of a lane-departure warning system.

SUMMARY OF THE INVENTION

The invention is therefore based on the object of developing a driver assistance device for warning a driver of a motor vehicle of a risk of departure from the lane or the lane, which device is capable of differentiating between a coloured edge-of-lane marking, which is applied to the surface of the lane, and a structural boundary at the edge of the lane.

DETAILED DESCRIPTION OF THE INVENTION

The object is achieved in a device of the generic type mentioned at the beginning in that, in addition to the image-transmitting sensor, at least one distance-transmitting sensor is connected to the evaluation device, with which sensor the distance from objects which are elevated with respect to the surface of the lane can be determined in the region of the edge of the lane, in particular a structural boundary of the edge of the lane, and/or with which the distance from a border at which the surface of the lane ends in the region of the edge of the lane and drops away to a piece of lower surrounding land, such as, for example, in the case of elevated asphalt coverings or trenches or water channels which run adjacent to the edge of the lane and in parallel with the lane, can be determined.

The driver assistance device according to the invention has, in comparison with the prior art, the advantage that, as a result of the additional, distance-transmitting sensor, an object which is elevated with respect to the surface of the lane can be detected in the region of the edge of the lane, in particular a structural boundary, so that when a specific minimum distance from this object is undershot a warning can be issued to the driver of the motor vehicle even before there is contact between the motor vehicle and this object.

As a result, in particular in sections of a road in which an edge-of-lane marking is not arranged but instead a structural boundary is arranged at the edge of the lane and is firstly detected by the image-transmitting sensor and the evaluation device as an end-of-lane marking, it is possible to differentiate between a structural boundary and edge-of-lane marking. For example, the outputting of the warning signal can be adapted to different configurations of the edge of the lane. In areas in which a structural boundary forms the edge of the lane it is thus possible to warn of a risk of departure from the lane even before the motor vehicle enters into contact with the structural boundary, whereas, when an edge-of-lane marking is present, it is possible, as in the past, to issue a warning only when the vehicle enters into contact with the marking or passes beyond the marking, or it is possible to intervene automatically in the control of the vehicle. In addition, in sections of a road in which there are no edge-of-lane markings, it is still possible to detect the edge of the lane even in situations in which a structural boundary forms the edge of the lane but cannot be detected owing to a poor contrast in the camera image of the image-transmitting sensor. This is frequently the case, for example, when there are kerb stones.

Furthermore, by detecting objects which are elevated with respect to the lane, in particular the kerb, by means of a distance-transmitting sensor which operates independently of the image-transmitting sensor, the probability of an incorrect warning, for example as a result of an edge of lane which can be detected visibly only with difficulty, is significantly reduced, as a result of which a higher level of acceptance and greater trust in the driver assistance device on the part of the driver of the motor vehicle are achieved. As a result, the traffic safety and road safety of motor vehicles which are equipped with such driver assistance devices can be further increased on an enduring basis.

One advantageous embodiment of the invention provides for the distance-transmitting sensor to be usually arranged in a transverse direction with respect to the longitudinal axis of the vehicle, in particular for the purpose of monitoring the blind spot, in order to determine the distance between the vehicle and an edge of lane which is elevated with respect to the lane, in particular a structural boundary of the edge of the lane, for example a kerb.

One particularly advantageous embodiment of the invention provides that, instead of a distance-transmitting sensor, or in addition to such a sensor, a height-estimating sensor is used, with an edge-of-lane marking being differentiated from a kerb by height estimation. In particular, it is conceivable in this context to define a specific threshold value below which an edge of lane which is detected by the evaluation device in the area sensed by the image-transmitting sensor is classified as a marking, and above it as a structural boundary. If the threshold value is evaluated in terms of absolute value, it is equally possible to detect structural boundaries in the form of elevations and in the form of depressions, for example trenches and the like, by defining only one threshold value. In addition, further information about the conditions after the edge-of-lane marking or after the structural boundary can also be acquired by the height-estimating sensor, for example trenches or earth walls running next to the lane can be detected.

Another advantageous embodiment of the invention provides for the distance-transmitting sensor to be part of another driver assistance device, preferably a parking aid. The distance-transmitting sensor may be a stereo camera, a 3D camera, a monocamera which operates with structured lighting, an ultrasonic sensor, a radar sensor, a lidar sensor or any other sensor which operates with laser light.

An additional advantageous embodiment of the invention provides that, instead of a distance-transmitting sensor, or in addition to such a sensor, a sensor which, on the basis of different reflection behaviour of objects such as, for example, the surface of the lane and the surrounding area, permits differentiation between said objects, is connected to the evaluation device. Thus, it is possible, for example, to differentiate between asphalt and grass using a radar sensor.

Brief description of the drawing in which FIG. 1 shows a schematic illustration of the areas sensed by the image-transmitting sensors and the distance-transmitting or height-estimating sensor, in a section of a road with a structural boundary in the form of a kerb at the edge of the lane.

A section 1 of a lane 2 has two lanes 9 which are separated by a lane marking 3 in the form of centre marks 4, and an edge of lane 5 which is formed by a structural boundary. The structural boundary of the edge 5 of the lane is composed of kerb stones 7 which are arranged one next to the other and which form a kerb 6. No additional edge-of-lane marking in the form of a coloured marking running in parallel with the kerb 6 is arranged in the of road section 1 of road.

A motor vehicle 8 is equipped with a driver assistance device for warning the driver of the motor vehicle 8 of a risk of departure from the lane 2 or from the lane, here by means of two image-transmitting sensors 10, an evaluation device 11 which is connected to the image-transmitting sensors, for detecting edge-of-lane and/or lane markings 3 and/or edges 5 of the lane in the areas 12 sensed by the image-transmitting sensors 10, as well as a warning device 13 which is connected to the evaluation device. The areas 12 of the two image-transmitting sensors 10 can also overlap, in contrast to the illustration in FIG. 1. Likewise, the range of the image-transmitting sensors in FIG. 1 is not illustrated to scale. On the side of the motor vehicle 8 facing the edge 5 of the lane, for example a distance-transmitting or an equivalent height-estimating sensor 13, which is also connected to the evaluation device 13, is additionally arranged, said sensor 13 sensing, in particular, an area 15 which is directed at the edge 5 of the lane. The area 12 which is sensed by the image-transmitting sensors 10 is examined by the evaluation device 11 for edge-of-lane markings and evaluated.

Since no edge-of-lane markings are arranged on the surface of the lane in the section 1 of road, the evaluation device 11 firstly detects the kerb 6 as an edge-of-lane marking. The distance-transmitting or height-estimating sensor 14 supplies, by means of the distance measurement or by means of the estimate of the height, the additional information that the kerb 6 which is detected as an edge-of-lane marking is elevated with respect to the surface of the lane. This information is acquired from a distance profile, created from the measured values of the distance-transmitting sensor, in the region of the edge of the lane, from which profile a structural boundary becomes apparent, whether it be a trench or an elevation, in the form of a discontinuity at the edge of the lane, corresponding to the elevation of the structural boundary with respect to the surface of the lane, in comparison with the approximately linearly extending distance profile of the surface of the lane. As a result, for the evaluation device 11 it is clear that the kerb 6 which is supposedly detected as an edge-of-lane marking is actually a structural boundary of the edge 5 of the lane. The evaluation device 11 can thus use this information to differentiate between structural boundaries of the edge 5 of the lane and edge-of-lane markings, and correspondingly change the triggering parameters for the warning device 13. Such a change in the triggering parameters may take the form, for example, that in sections 1 of a road in which edge-of-lane markings are present a warning is still triggered only if the vehicle enters into contact with or passes beyond the edge-of-lane marking, whereas a warning is already issued in advance in areas with a structural boundary of the edge 5 of the lane.

It is also conceivable for the driver assistance device to have an image-transmitting sensor 10 and an additional sensor which both look forwards in the direction of travel and sideways beyond the lane marking and the edge of the lane. In addition it is conceivable to use a plurality of additional sensors, for example one on each side of the vehicle.

Furthermore it is conceivable to extract information about the quality of the edge of the lane from electronic road maps with corresponding properties, for example to determine whether the edge of the lane has a kerb stone, a hard shoulder, a trench or the like.

The core of the invention here is to acquire information about elevated objects near to the motor vehicle by using additional ambient parameter sensors in conjunction with a lane-departure warning system. Such information may comprise distance measurements, in particular by means of methods in which emitted signals are reflected at vertical boundaries of the elevated object, or a height estimation of sensed objects. By combination with the lane or edge-of-lane marking which is detected by means of the image-transmitting sensor it is possible to assign elevated objects, in particular a structural boundary of the edge of the lane, to the edge-of-lane marking. As a result, a warning can be issued to the driver of the motor vehicle or a steering or braking intervention can be carried out, for example a braking intervention in an individual wheel, which returns the motor vehicle into the lane, even before the vehicle enters into contact with, or passes beyond, the edge-of-lane marking. Thus, it is possible to avoid contact with a structural boundary at the edge of the lane, for example a kerb. Such ambient parameter sensors may be, for example, a stereo camera for estimating the height of objects which are elevated with respect to the lane, sensors for monitoring blind spots such as, for example, a radar or lidar sensor, a monocamera in combination with patterned illumination, or parking sensors, for example radar, lidar or ultrasonic sensors which also look sideways beyond the lane of the vehicle and/or sense the space to the side of the vehicle.

The invention can be applied industrially in particular in the field of the manufacture and the operation of driver assistance devices for motor vehicles, especially driver assistance devices for warning a driver of a motor vehicle of a risk of departure from the lane or the lane.

The invention claimed is:

1. A driver assistance device for warning a driver of a motor vehicle of a risk of departure from the road or from the lane in which he is driving, said device comprising:
   at least one image-transmitting sensor,
   a distance-transmitting sensor,
   an evaluation device, connected to the image-transmitting sensor and the distance—transmitting sensor, for detecting a structure condition of a road edge and/or a lane edge, comprising:
   means for creating a distance profile from measured values of the distance-transmitting sensor to detect discontinuity in the distance profile, and
   means for detecting a structural boundary at the region of the edge of lane on the basis of a detected discontinuity in the distance profile to differentiate between the structural boundary and edge-of-lane markings, indicative of a structure condition of the road edge and/or lane edge;

a warning device which is connected to the evaluation device, wherein the warning device varies time points of warning output, indicating a risk of departure from the road or from the lane which the vehicle is in, depending on the structure condition of the road edge and/or the lane edge.

2. The driver assistance device according to claim 1, further comprising a height-estimating sensor connected to the evaluation device.

3. The driver assistance device according to claim 2, further comprising:

means for creating a height profile from measured values of the height-estimating sensor, and means for detecting a structural boundary on the basis of a discontinuity in the height profile.

4. The driver assistance device according to claim 2, wherein the distance-transmitting sensor and/or the height-estimating sensor are arranged predominantly in a direction transverse to a longitudinal axis of the vehicle.

5. The driver assistance device according to claim 2, wherein the distance-transmitting sensor and/or the height-estimating sensor are part of another driver assistance device.

6. The driver assistance device according to claim 1, further comprising a sensor for detecting different reflection behaviour of objects, which, on the basis of the different reflection behaviour of the objects, permits differentiation between the objects, the sensor for detecting different reflection behaviour being connected to the evaluation device.

7. A driver assistance device for warning a driver of a motor vehicle of a risk or departure from the road or from the lane in which he is driving, said device comprising:

at least one image-transmitting sensor, a height-estimating sensor, an evaluation device, connected to the image-transmitting sensor and the height-estimating sensor, for detecting a structure condition of a road edge and/or a lane edge, comprising:

means for creating a height profile from measured values of the height-estimating sensor to detect a discontinuity in the height profile, and means for detecting a structural boundary at the region of the edge of lane on the basis of a detected discontinuity in the height profile to differentiate between the structural boundary and edge-of-lane markings, indicative of a structure condition of the road edge and/or lane edge;

a warning device which is connected to the evaluation device, wherein the warning device varies time points of warning output, indicating a risk of departure from the road or from the lane which the vehicle is in, depending on the structure condition of the road edge and/or the lane edge.

8. A method for operating a driver assistance device for warning a driver of a motor vehicle of a risk of departure from the road or from the lane in which he is driving, the driver assistance device detecting a structure condition of a road edge and/or a lane edge, the method comprising:

creating a distance and/or height profile from measured values of a distant-transmitting and/or height-estimating sensor for detecting the structure condition of the road edge and/or the lane edge, and detecting a structural boundary at the region of the edge of road/lane on the basis of a discontinuity in such a profile to differentiate between the structural boundary and edge-of-lane markings, indicative of the structure condition of the road edae and/or lane edge, varying time points of warning output by a warning device depending on the detected structure condition of the road edge and/or the lane edge, wherein when there is a road/lane marking, warning the driver of the motor vehicle of a risk of departure from the road or from the lane only when the vehicle enters into contact with or passes beyond the marking, and when there is a structural boundary, warning in advance the driver of the motor vehicle of a risk of departure from the road or from the lane before the vehicle enters into contact with the structural boundary.

* * * * *